United States Patent
Nakagawa

(10) Patent No.: US 11,211,025 B2
(45) Date of Patent: Dec. 28, 2021

(54) LIQUID CRYSTAL DISPLAY PANEL

(71) Applicant: Panasonic Liquid Crystal Display Co., Ltd., Himeji (JP)

(72) Inventor: Teruhisa Nakagawa, Hyogo (JP)

(73) Assignee: PANASONIC LIQUID CRYSTAL DISPLAY CO., LTD., Himeji (JP)

( * ) Notice: Subject to any disclaimer, the term of this patent is extended or adjusted under 35 U.S.C. 154(b) by 23 days.

(21) Appl. No.: 16/794,506

(22) Filed: Feb. 19, 2020

(65) Prior Publication Data

US 2021/0225317 A1  Jul. 22, 2021

(30) Foreign Application Priority Data

Jan. 19, 2020 (CN) .......................... 202010061168.9

(51) Int. Cl.
  *G09G 3/36* (2006.01)
  *G09G 3/34* (2006.01)

(52) U.S. Cl.
  CPC ......... *G09G 3/3688* (2013.01); *G09G 3/3406* (2013.01); *G09G 2310/027* (2013.01); *G09G 2310/0278* (2013.01)

(58) Field of Classification Search
  CPC ............... G09G 3/3688; G09G 3/3406; G09G 2310/0278; G09G 2310/027
  See application file for complete search history.

(56) References Cited

U.S. PATENT DOCUMENTS

| | | | | |
|---|---|---|---|---|
| 2009/0244424 | A1* | 10/2009 | Kim | G02F 1/133707 349/48 |
| 2011/0279418 | A1* | 11/2011 | Han | G02F 1/136286 345/204 |
| 2016/0187752 | A1* | 6/2016 | Zhang | G02F 1/13306 349/106 |
| 2017/0162637 | A1* | 6/2017 | Choi | G09G 3/20 |
| 2017/0220148 | A1* | 8/2017 | Zhou | G02F 1/13338 |
| 2018/0136528 | A1* | 5/2018 | Xiao | G02F 1/133512 |
| 2018/0210303 | A1* | 7/2018 | Wang | G09G 3/3614 |
| 2021/0098561 | A1* | 4/2021 | Park | H01L 27/3276 |
| 2021/0111372 | A1* | 4/2021 | Park | H01L 51/56 |

FOREIGN PATENT DOCUMENTS

CN      106125427 B      5/2019

* cited by examiner

*Primary Examiner* — Carolyn R Edwards
(74) *Attorney, Agent, or Firm* — Westerman, Hattori, Daniels & Adrian, LLP

(57) ABSTRACT

A liquid crystal display panel, which includes: a plurality of pixels arranged in a row direction and a column direction, the pixel comprising a transistor; a plurality of data lines extending in the column direction, and including a first data line and a second data line; and a plurality of scan lines extending in the row direction, and crossing the plurality of data lines. The first data line and the second data line are disposed between two adjacent pixel columns, and partially overlap in a thickness direction of the liquid crystal display panel.

12 Claims, 8 Drawing Sheets

LIQUID CRYSTAL DISPLAY PANEL

CROSS-REFERENCE TO RELATED APPLICATION

This application is based on and claims priority of Chinese application No. 202010061168.9 filed on Jan. 19, 2020. The entire disclosure of the above-identified application, including the specification, drawings and claims is incorporated herein by reference in its entirety.

TECHNICAL FIELD

The present disclosure relates to a liquid crystal display panel, and more particularly, to a liquid crystal display panel using a 1G2D (one gate line and two data line) driving method.

BACKGROUND

As the user's demand for display quality has increased, the number of pixels of the liquid crystal display panel has continued to increase. Accordingly, the writing time per pixel row becomes gradually shorter, posing a greater challenge to accurate writing of the potential. As one solution, a 1G2D driving method is proposed. In the 1G2D driving method, the same number of scan lines as the number of pixel rows are provided and the scan lines of two adjacent pixel rows are connected together, and the number of data lines twice the number of pixel columns are provided, the pixels of the same column being alternately connected to one or the other of the two data lines.

SUMMARY

The present disclosure describes a liquid crystal display panel comprising: a plurality of pixels arranged in a row direction and a column direction, the pixel comprising a transistor; a plurality of data lines extending the column direction, and including a first data line and a second data line; and a plurality of scan lines extending the row direction, and crossing the plurality of data lines. The first data line and the second data line are disposed between two adjacent pixel columns, and partially overlap in a thickness direction of the liquid crystal display panel.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DETAILED DESCRIPTION

Figure 1:
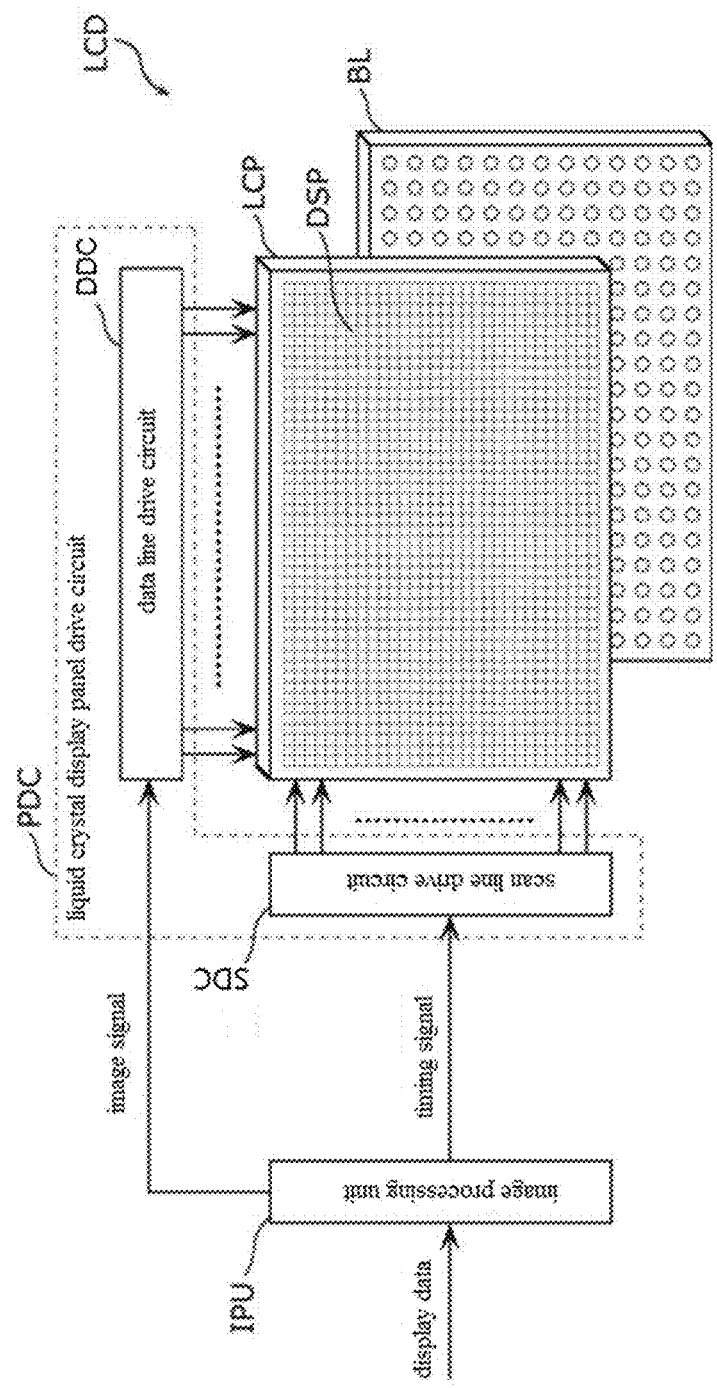
FIG. 1 is a diagram showing a schematic configuration of a liquid crystal display device LCD according to the present disclosure.

Various exemplary embodiments, features and aspects of the present disclosure will be described in detail below with reference to the accompanying drawings. In the drawings, like reference numbers can indicate functionally identical or similar elements. While the various aspects of the embodiments are presented in drawings, the drawings are not necessarily drawn to scale unless specifically indicated.

Furthermore, in the following detailed description, numerous specific details are set forth in order to provide a better understanding of the present disclosure. It will be understood by those skilled in the art that the present disclosure may be practiced without some of these specific details. In some instances, methods, procedures, components, and circuits that are well known to those skilled in the art have not been described in detail so as not to obscure the present disclosure.

Figure 2:
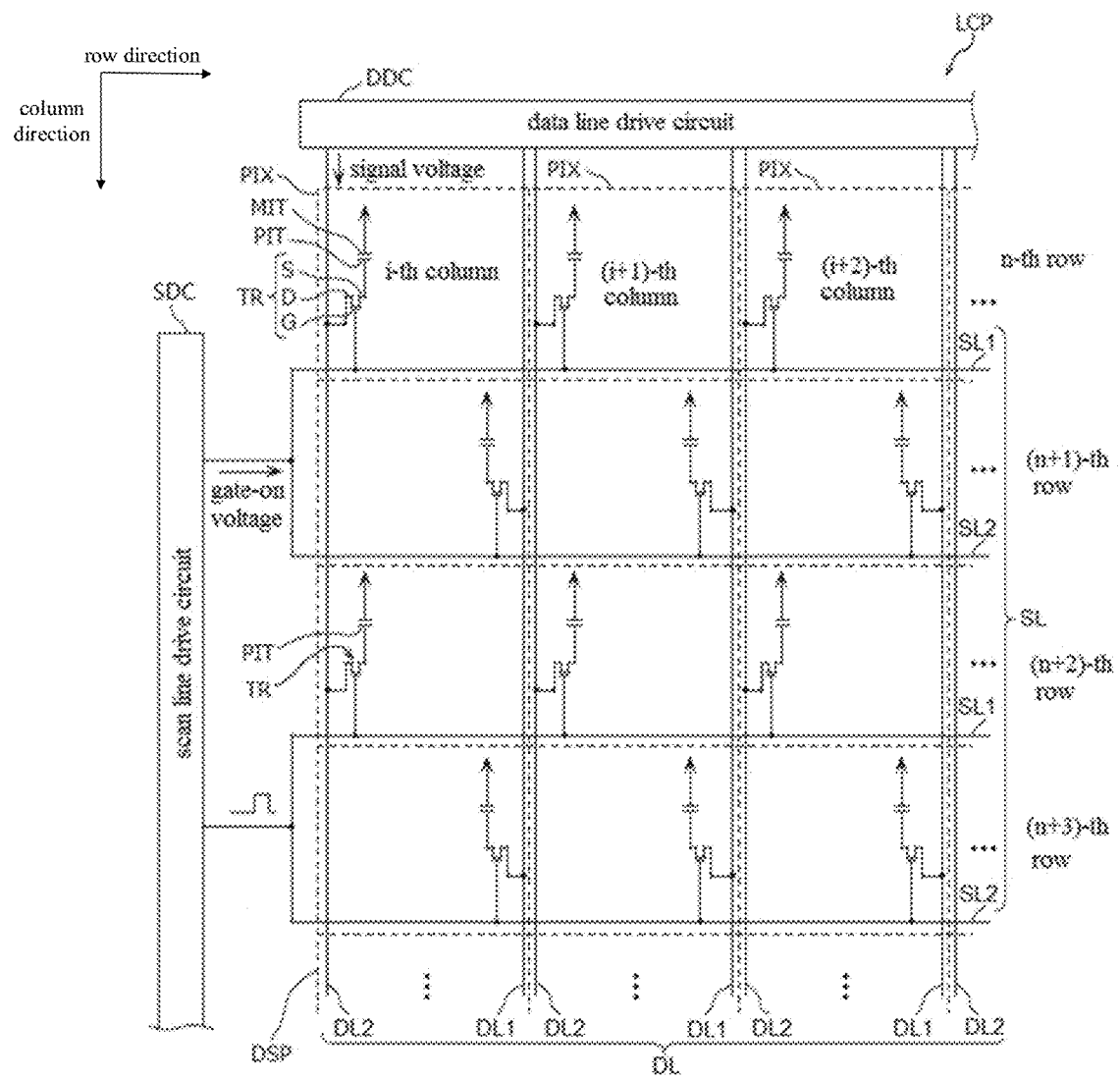
FIG. 2 is a diagram showing a pixel circuit of a liquid crystal display panel LCP according to the present disclosure.

First, a liquid crystal display device LCD and a liquid crystal display panel LCP using the 1G2D driving method according to the present disclosure will be described with reference to FIGS. 1 and 2. FIG. 1 is a diagram showing a schematic configuration of a liquid crystal display device LCD according to the present disclosure. FIG. 2 is a diagram showing a pixel circuit of a liquid crystal display panel LCP according to the present disclosure.

The liquid crystal display device LCD is an example of an image display device that displays a still image or a moving image. As shown in FIG. 1, the liquid crystal display device LCD may include a liquid crystal display panel LCP, a liquid crystal display panel drive circuit PDC (a data line drive circuit DDC, a scan line drive circuit SDC), a backlight BL, and an image processing unit IPU.

The liquid crystal display panel LCP is disposed on the light emitting side of the backlight BL. The liquid crystal display panel LCP displays a color image or a monochrome image in the image display region DSP. As shown in FIG. 2, the liquid crystal display panel LCP includes a plurality of pixels PIX arranged in a row direction and a column direction.

The backlight BL is disposed on a back side of the liquid crystal display panel LCP, and emits the light toward the liquid crystal display panel LCP. The backlight BL may be a Light Emitting Diode (LED) backlight in which an LED is used as a light source, but is not limited thereto. The backlight BL may be a direct under type LED backlight in which LEDs are two-dimensionally arranged on a substrate so as to face the liquid crystal display panel LCP, or may be an edge-type backlight. The backlight BL may be a surface-emitting unit that emits planar, uniform scattered light (diffused light) by providing a diffusing plate for diffusing light from the light source.

The image processing unit IPU may be a control device including an arithmetic processing circuit such as a CPU and a memory such as a ROM and a RAM, and executes various processes by reading out and executing a program stored in the memory by the CPU. The image processing unit IPU receives input of display data to be displayed on the liquid crystal display panel LCP, performs various image signal processes such as color adjustment on the display data, generates an image signal indicating a gray scale value of each pixel PIX and a timing signal indicating a timing of writing the image signal to each pixel PIX, outputs the image signal to the data line drive circuit DDC, and outputs the timing signal to the scan line drive circuit SDC.

As shown in FIG. 2, the data line drive circuit DDC is connected to data lines DL of the liquid crystal display panel LCP extending in the column direction. The data line drive circuit DDC supplies a signal voltage corresponding to an image signal input from the image processing unit IPU to the data lines DL in response to selection of the scan lines SL by the scan line drive circuit SDC. The scan line drive circuit SDC is connected to scan lines SL of the liquid crystal display panel LCP extending in the row direction and crossing the data lines DL. The scan line drive circuit SDC selects a pixel PIX to which an image signal is to be written in accordance with the timing signal input from the image processing unit IPU, and supplies a voltage (gate-on voltage) for turning on the transistor TR of the selected pixel PIX to the scan line SL. Each pixel PIX includes a pixel electrode PIT and a transistor TR. A gate electrode G of the transistor TR is electrically connected to the scan line SL, a drain electrode D of the transistor TR is electrically connected to the data line DL, and a source electrode S of the transistor TR is electrically connected to the pixel electrode PIT.

Thus, when the gate-on voltage is supplied from the scan line drive circuit SDC to the scan line SL, the transistor TR of the selected pixel PIX is turned on, and the signal voltage is supplied from the data line DL connected to the transistor TR to the pixel electrode PIT. An electric field is generated in the liquid crystal layer due to a difference between the signal voltage supplied to the pixel electrode PIT and a common voltage supplied to a common electrode MIT. An alignment state of the liquid crystal molecules in the liquid crystal layer of each pixel PIX is changed by the electric field, and transmittance of light of backlight BL passing through the liquid crystal display panel LCP is controlled in each pixel PIX. Accordingly, a desired image is displayed in the image display region DSP of the liquid crystal display panel LCP.

As shown in FIG. 2, when the 1G2D driving method is adopted, the first scan line SL1 and the second scan line SL2 are connected to each other, and the scan line drive circuit SDC inputs the gate-on voltage (scan voltage) to the first scan line SL1 and the second scan line SL2 at the same timing. The first data line DL1 and the second data line DL2 are disposed between two adjacent pixel columns, and the data line drive circuit DDC supplies signal voltages to the first data line DL1 and the second data line DL2, respectively. The drain electrode of a transistor electrically connected to one of the first scan line SL1 and the second scan line SL2 is electrically connected to one of the first data line DL1 and the second data line DL2, and the drain electrode of a transistor electrically connected to the other of the first scan line SL1 and the second scan line SL2 is electrically connected to the other of the first data line DL1 and the second data line DL2.

Specifically, in the example shown in FIG. 2, the gate electrodes of the transistors of the pixels in the n-th (n>0 and n is an integer) and (n+2)-th rows are electrically connected to the first scan line SL1, and the drain electrodes are electrically connected to the second data line DL2 located on the left side of the pixels; and the gate electrodes of the transistors of the pixels in the (n+1)-th and (n+3)-th rows are electrically connected to the second scan line SL2, and the drain electrodes are electrically connected to the first data line DL1 located on the right side of the pixels.

Since two scan lines SL are connected together, the scan line drive circuit SDC can supply a pulse signal having a pulse width twice as long as the width when the 1G2D driving method is not used, to the first scan line SL1 and the second scan line SL2 connected together as the gate-on voltage common to the first scan line SL1 and the second scan line SL2, thereby lengthening the writing time of each pixel row.

Figure 12:
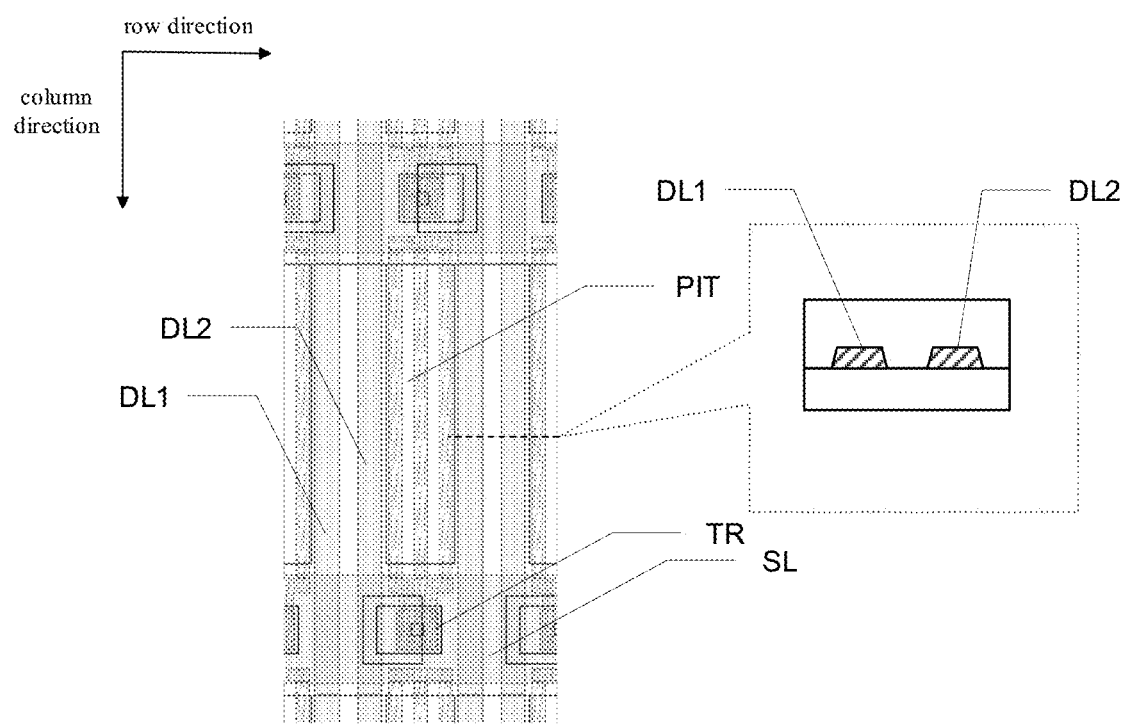
FIG. 12 is a partially enlarged view of a liquid crystal display panel as a comparative example when viewed from the observer side.

In the case of the 1G2D driving method as described above, FIG. 12 shows a wiring scheme as a comparative example of the present disclosure. As shown in FIG. 12, in this comparative example, the first data line DL1 and the second data line DL2 extend in parallel along the column direction and are arranged side by side in the same layer between two pixel columns. However, after intensive research, the inventors of the present application have found that, if such a wiring scheme is used, the area of the pixel electrode PIT would be reduced due to an increase in the number of data lines as compared with the case where the 1G2D driving method is not used, and thus the aperture ratio of the display panel is decreased.

In order to solve the problem, the inventors of the present application proposed a new wiring scheme in which the first data line DL1 and the second data line DL2 partially overlap in the thickness direction of the liquid crystal display panel LCP, thereby reducing the area occupied by the data lines. This new wiring scheme can enable the 1G2D driving method and also avoid the problem of the decreased aperture ratio. Respective examples of the liquid crystal display panel according to the present disclosure will be described in detail below with reference to FIGS. 3 to 11.

Figure 3:
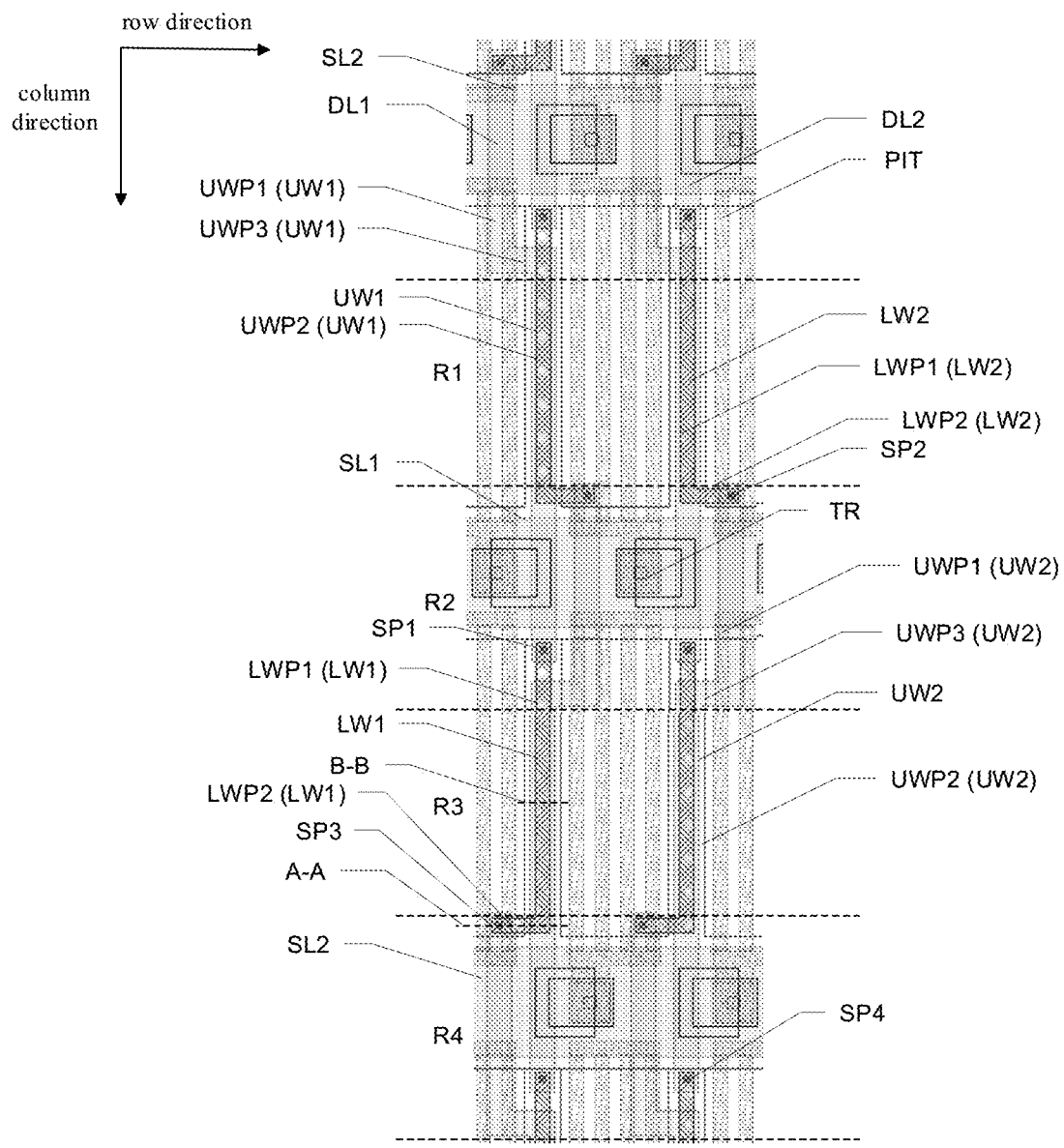
FIG. 3 is a partially enlarged view of a first example of the liquid crystal display panel LCP according to the present disclosure when viewed from the observer side.
Figure 4:
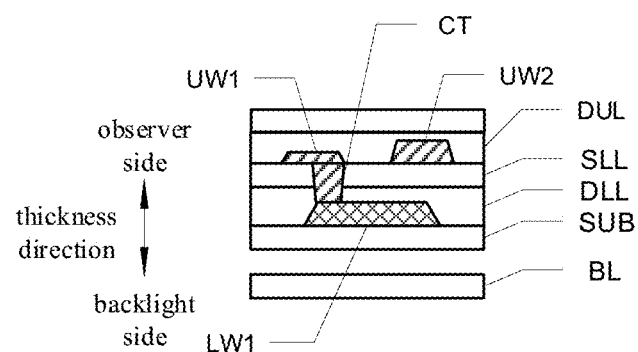
FIG. 4 is a sectional view showing an A-A sectional structure in FIG. 3.
Figure 5:
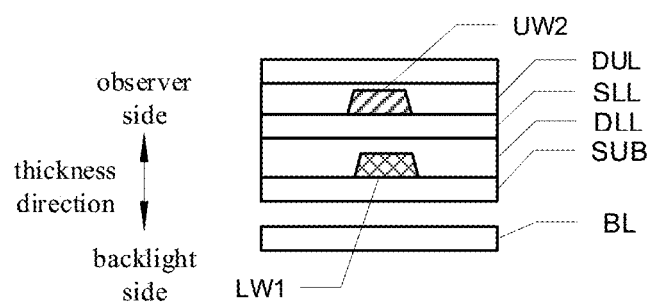
FIG. 5 is a sectional view showing a B-B sectional structure in FIG. 3.

FIGS. 3, 4 and 5 show a first example of the liquid crystal display panel LCP according to the present disclosure. FIG. 3 is a partially enlarged view of the liquid crystal display panel when viewed from the observer side, FIG. 4 is a sectional view showing an A-A sectional structure in FIG. 3, and FIG. 5 is a sectional view showing a B-B sectional structure in FIG. 3. In the first example, the upper wiring and the lower wiring formed at different layers in the thickness direction of the liquid crystal display panel LCP are connected to form the first data line DL1 and the second data line DL2, and the upper wiring and the lower wiring partially overlap in the thickness direction.

Specifically, as shown in FIG. 3, the first data line DL1 includes first upper wirings UW1 and first lower wirings LW1 electrically connected to the first upper wirings UW1, which are alternately arranged in the column direction, and the second data line DL2 includes second upper wirings UW2 and second lower wirings LW2 electrically connected to the second upper wirings UW2, which are alternately arranged in the column direction.

Each of the first upper wiring UW1 and the second upper wiring UW2 has a structure resembling a Z-shape or an inverted Z-shape, and includes a first upper wiring portion UWP1, a second upper wiring portion UWP2, and a third upper wiring portion UWP3. The first upper wiring portion UWP1 and the second upper wiring portion UWP2 extend along the column direction. The third upper wiring portion UWP3 extends along the row direction and connects the first upper wiring portion UWP1 and the second upper wiring portion UWP2. Each of the first lower wiring LW1 and the second lower wiring LW2 has a structure resembling a L-shape or an inverted L-shape, and includes a first lower wiring portion LWP1 and a second lower wiring portion LWP2. The first lower wiring portion LWP1 extends along the column direction. The second lower wiring portion LWP2 extends along the row direction, and has one end connected to the first lower wiring portion LWP1. Alternatively, the third upper wiring portion UWP3 and the second lower wiring portion LWP2 may extend along a direction crossing the column direction other than the row direction.

An end portion of the first upper wiring portion UWP1, which is located on an opposite side from the third upper wiring portion UWP3, of the first upper wiring UW1 is electrically connected to an end portion of the second lower wiring portion LWP2, which is located on the opposite side from the first lower wiring portion LWP1, of the first lower wiring LW1 located upstream in the column direction. An end portion of the second upper wiring portion UWP2, which is located on the opposite side from the third upper wiring portion UWP3, of the first upper wiring UW1 is electrically connected to an end portion of the first lower wiring portion LWP1, which is located on the opposite side from the second lower wiring portion LWP2, of the first lower wiring LW1 located downstream in the column direction. As such, the first upper wirings UW1 and the first lower wirings LW1 alternately arranged in the column direction are connected to form the first data line DL1. In a similar manner, the second upper wirings UW2 and the second lower wirings LW2 alternately arranged in the column direction are connected to form the second data line DL2.

The liquid crystal display panel LCP may include a first overlapping region R1, a first switching region R2, a second overlapping region R3, and a second switching region R4 according to a relative positional relationship of the first and second data lines DL1 and DL2. The first overlapping region R1, the first switching region R2, the second overlapping region R3, and the second switching region R4 are arranged in this order along the column direction. In the first overlapping region R1, the second upper wiring portion UWP2 of the first upper wiring UW1 and the first lower wiring portion LWP1 of the second lower wiring LW2 overlap in the thickness direction. In the first switching region R2, the first data line DL1 is switched from the first upper wiring UW1 to the first lower wiring LW1 at a first switching point SP1, and the second data line DL2 is switched from the second lower wiring LW2 to the second upper wiring UW2 at a second switching point SP2. In the second overlapping region R3, the first lower wiring portion LWP1 of the first lower wiring LW1 and the second upper wiring portion UWP2 of the second upper wiring UW2 overlap in the thickness direction. In the second switching region R4, the first data line DL1 is switched from the first lower wiring LW1 to the first upper wiring LW1 at a third switching point SP3, and the second data line DL2 is switched from the second upper wiring UW2 to the second lower wiring LW2 at a fourth switching point SP4.

As shown in FIG. 4, the first upper wiring UW1 and the second upper wiring UW2 are formed in the data line upper layer DUL, and the first lower wiring LW1 and the second lower wiring LW2 are formed in the data line lower layer DLL, which is located at the backlight side with respect to the data line upper layer DUL. In order to reduce the mutual influence between the data lines, the data line lower layer DLL may be optionally disposed on the backlight side with respect to the scan line layer SLL in which the scan lines SL are formed. That is, the scan line layer SLL is disposed between the data line upper layer DUL and the data line lower layer DLL. This arrangement may help to reduce signal delay due to the mutual influence. Further alternatively, in order to simplify the process, the lower wiring may be directly formed on the substrate SUB on the backlight side, of the two substrates disposed opposite to each other of the liquid crystal display panel LCP. That is, the data line lower layer DLL is located between the scan line layer SLL and the substrate SUB. However, the above structure is merely exemplary, and a specific position of the data line lower layer is not limited in the present disclosure.

As shown in the A-A sectional structure of FIG. 4 passing through the third switching point SP3, the upper end of the conductor CT penetrating the scan line layer SLL is in contact with the first upper wiring UW1, and the lower end is in contact with the left end portion of the first lower wiring LW1 (the end portion of the second lower wiring portion LWP2 on the opposite side from the first lower wiring portion LWP1), thereby electrically connecting the first lower wiring LW1 with the first upper wiring UW1, so that the first data line DL1 is switched from the first lower wiring LW1 to the first upper wiring UW1. As shown in the B-B sectional structure, which is located in the second overlapping region R3, per FIG. 5, the second upper wiring UW2 and the first lower wiring LW1 overlap in the thickness direction via the scan line layer SLL.

As shown in FIG. 3, in the first switching region R2, the first scan line SL1 passes through the first switching region R2, the first switching point SP1 and the second switching point SP2 are located at both sides of the first scan line SL1, and the first upper wiring UW1 and the second upper wiring UW2 cross the first scan line SL1 above the first scan line SL1. The first upper wiring UW1 is electrically connected to the transistor TR located on the left side of the first upper wiring UW1. In order to facilitate connection to the first upper wiring UW1, the transistor TR is located on the side of the first upper wiring UW1, that is, on the right side, with respect to a central portion of the connected pixel electrode PIT. The second upper wiring UW2 is located on the opposite side of the first upper wiring UVV1 from the transistor, i.e., on the right side.

In the second switching region R4, the second scan line SL2 passes through the second switching region R4, the third switching point SP3 and the fourth switching point SP4 are located at both sides of the second scan line SL2, and the first upper wiring UW1 and the second upper wiring UW2 cross the second scan line SL2 above the second scan line SL2. The second upper wiring UW2 is electrically connected to the transistor TR located on the right side thereof. In order to facilitate connection to the second upper wiring UW2, the transistor TR is located on the side of the second upper wiring UW2, that is, on the left side, with respect to the central portion of the pixel electrode PIT. The first upper wiring UW1 is located on the opposite side of the second upper wiring UW2 from the transistor, i.e., on the left side.

As described above, in the first example, in the first overlapping region R1 and the second overlapping region R3, the first data line DL1 and the second data line DL2 overlap in the thickness direction, and in the first switching region R2 and the second switching region R4, the first data line DL1 and the second data line DL2 perform switching between the upper wiring and the lower wiring and connection with the transistor, thereby enabling the 1G2D driving method while also maintaining a high aperture ratio.

Figure 6:
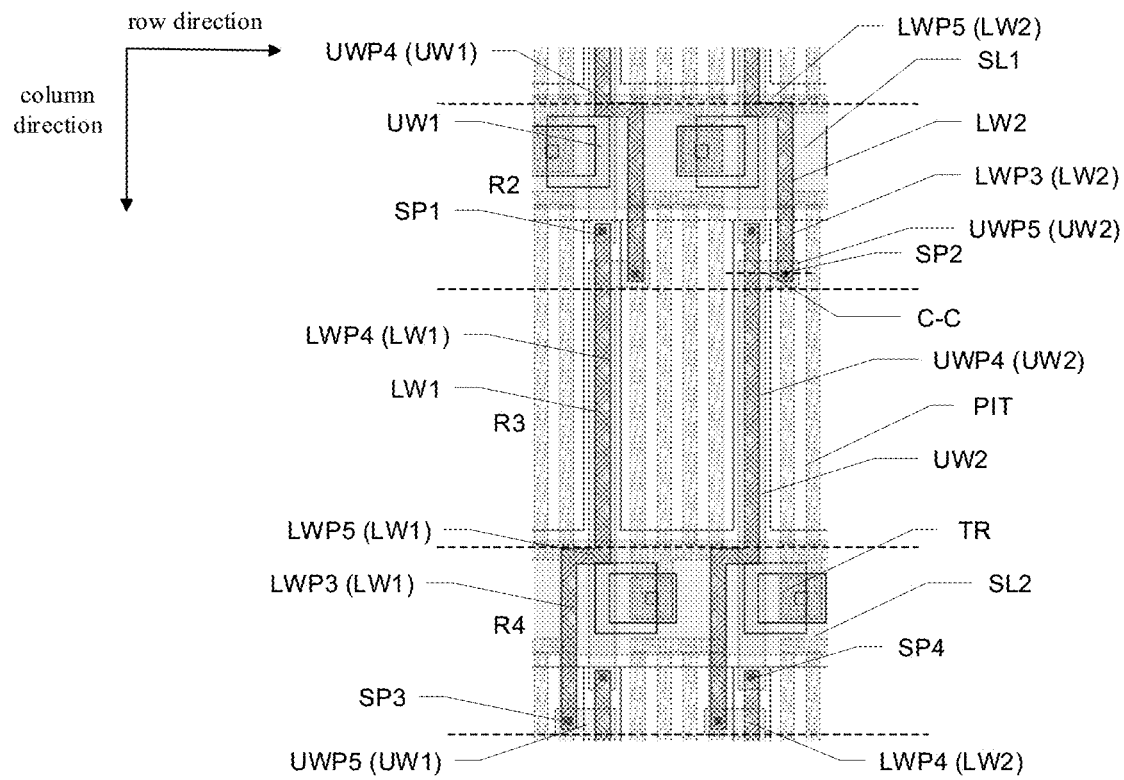
FIG. 6 is a partially enlarged view of a second example of the liquid crystal display panel LCP according to the present disclosure when viewed from the observer side.
Figure 7:
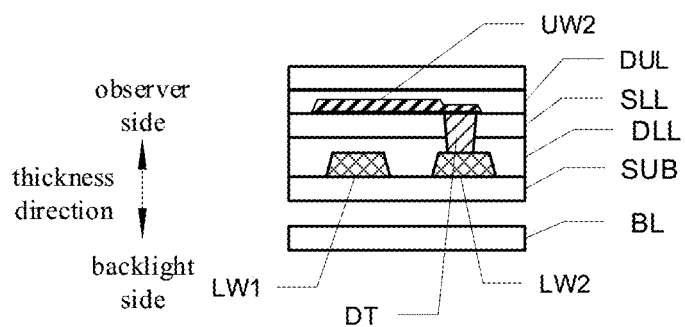
FIG. 7 is a sectional view showing a C-C sectional structure in FIG. 6.

FIGS. 6 and 7 show a second example of the liquid crystal display panel LCP according to the present disclosure. FIG. 6 is a partially enlarged view of the liquid crystal display panel when viewed from the observer side, and FIG. 7 is a sectional view showing a C-C sectional structure in FIG. 6. The second example shown in FIGS. 6 and 7 is different from the first example shown in FIGS. 3 to 5 mainly in that, by changing the shapes of the upper wiring and the lower wiring, the data lines not connected to the transistors are located below the scan lines in the first switching region R2 and the second switching region R4.

In the first example, as described above, in the first and second switching regions R2 and R4, the first and second data lines DL1 and DL2 cross the scan lines above. The scan line may be thicker than the first and second data lines DL1 and DL2. Therefore, when the first and second data lines DL1 and DL2 are thinner and pass over the thicker scan line, the probability of the first and second data lines DL1 and DL2 breaking is significantly increased. In order to reduce this risk, in the second example, only one of the first data line DL1 and the second data line DL2 which is electrically connected to the transistor is located above the scan line, and the other of the first data line DL1 and the second data line DL2 which is not electrically connected to the transistor is located below the scan line.

Specifically, as shown in FIG. 6, each of the first upper wiring UW1 and the second upper wiring UW2 resemble an L-shape, and includes a fourth upper wiring portion UWP4 and a fifth upper wiring portion UWP5. The fourth upper wiring portion UWP4 extends along the column direction. The fifth upper wiring portion UWP5 extends along the row direction and has one end connected to the fourth upper wiring portion UWP4. Each of the first lower wiring LW1 and the second lower wiring LW2 resemble a Z-shape, and include a third lower wiring portion LWP3, a fourth lower wiring portion LWP4, and a fifth lower wiring portion LWP5. The third lower wiring portion LWP3 and the fourth lower wiring portion LWP4 extend along the column direction. The fifth lower wiring portion LWP5 extends along the row direction and connects the third lower wiring portion LWP3 and the fourth lower wiring portion LWP 4. Alternatively, the fifth upper wiring portion UWP5 and the fifth lower wiring portion LWP5 may extend along a direction crossing the column direction other than the row direction.

An end portion of the fourth upper wiring portion UWP4, which is located on the opposite side from the fifth upper wiring portion UWP5, of the first upper wiring UW1 is electrically connected to an end portion of the fourth lower wiring portion LWP4, which is located on the opposite side from the fifth lower wiring portion LWP5, of the first lower wiring LW1 located downstream in the column direction. An end portion of the fifth upper wiring portion UWP5, which is located on the opposite side from the fourth upper wiring portion UWP4, of the first upper wiring UW1 is electrically connected to an end portion of the third lower wiring portion LWP3, which is located on the opposite side from the fifth lower wiring portion LWP5, of the first lower wiring LW1 located upstream in the column direction. As such, the first upper wirings UW1 and the first lower wirings LW1 alternately arranged in the column direction are connected to form the first data line DL1. In a similar manner, the second upper wirings UW2 and the second lower wirings LW2 alternately arranged in the column direction are connected to form the second data lines DL2.

In the first overlapping region R1 (not shown in FIG. 6), the fourth upper wiring portion UWP4 of the first upper wiring UW1 overlaps with the fourth lower wiring portion LWP4 of the second lower wiring LW2. In the second overlapping region R3, the fourth upper wiring portion UWP4 of the second upper wiring UW2 overlaps with the fourth lower wiring portion LWP4 of the first lower wiring LW1.

In the first switching region R2, the first scan line SL1 passes through the first switching region R2, the first switching point SP1 and the second switching point SP2 are located on the same side of the first scan line SL1, the first upper wiring UW1 crosses the first scan line SL1 above, the second lower wiring LW2 crosses the first scan line SL1 below, and the first upper wiring UW1 is electrically connected to the transistor TR located on the left side thereof. In the second switching region R4, the second scan line SL2 passes through the second switching region R4, the third switching point SP3 and the fourth switching point SP4 are located on the same side of the second scan line SL2, the second upper wiring UW2 crosses the second scan line SL2 above, the first lower wiring LW1 crosses the second scan line SL2 below, and the second upper wiring UW2 is electrically connected to the transistor TR located on the right side thereof.

As shown in the C-C sectional structure of FIG. 7 passing through the second switching point SP2, the upper end of the conductor DT passing through the scan line layer SLL is in contact with the right end portion of the second upper wiring UW2 (the end portion of the fifth upper wiring portion UWP5 on the opposite side from the fourth upper wiring portion UWP4), and the lower end is in contact with the second lower wiring LW2, thereby electrically connecting the second upper wiring UW2 with the second lower wiring LW2, so that the second data line DL2 is switched from the second lower wiring LW2 to the second upper wiring UW2.

As described above, in the second example, the data line not connected to the transistor crosses the scan line below, thereby reducing the risk of occurrence of breaking.

Figure 8:
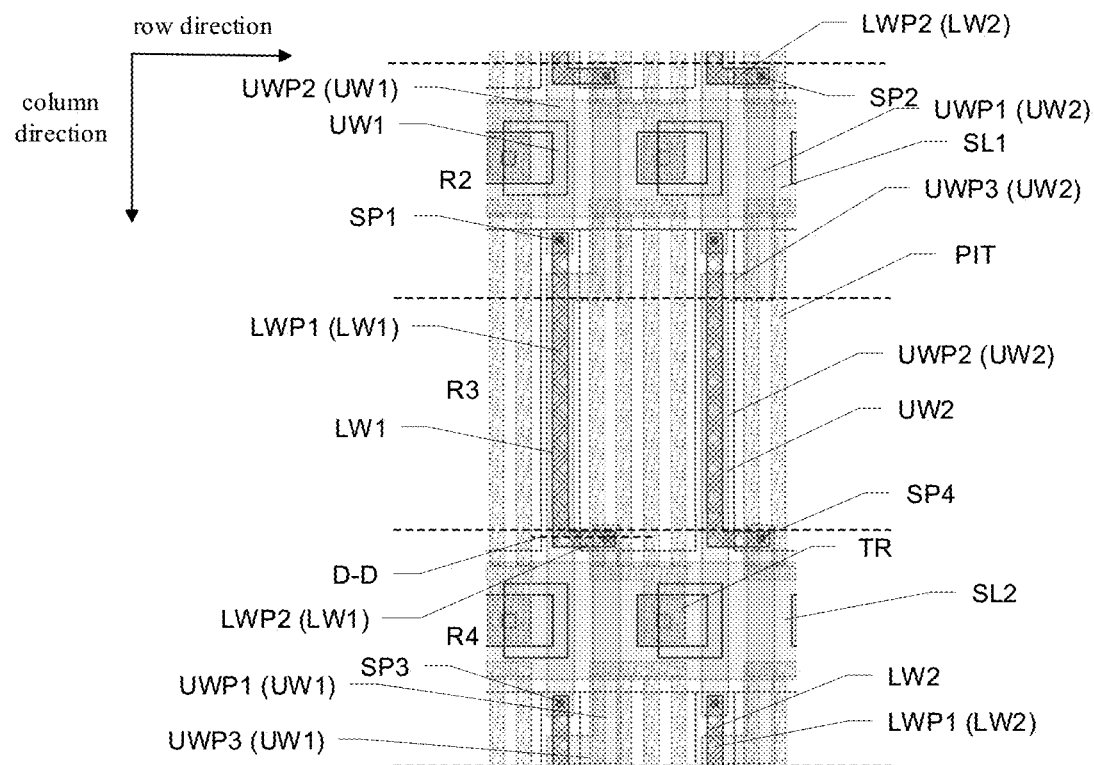
FIG. 8 is a partially enlarged view of a third example of the liquid crystal display panel LCP according to the present disclosure when viewed from the observer side.
Figure 9:
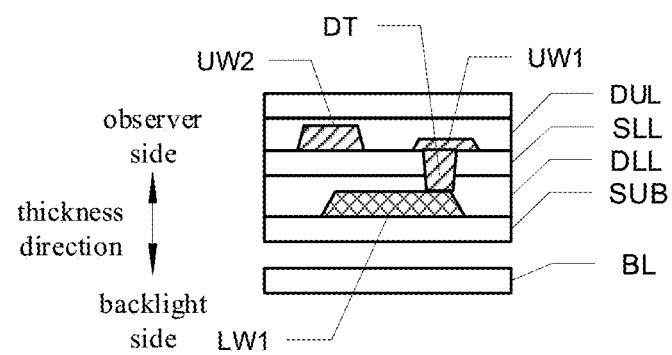
FIG. 9 is a sectional view showing a D-D sectional structure in FIG. 8.

FIGS. 8 and 9 show a third example of the liquid crystal display panel LCP according to the present disclosure. FIG. 8 is a partially enlarged view of the liquid crystal display panel when viewed from the observer side, and FIG. 9 is a sectional view showing a D-D sectional structure in FIG. 8. The third example shown in FIGS. 8 and 9 differs from the first example shown in FIGS. 3 to 5 mainly in that, instead of the pixels of the same column being alternately connected to the data lines located on different sides as in the first example, the pixels of the same column are connected to the data lines located on the same side in the third example. Specifically, in FIG. 3, in the first switching region R2, the transistor TR is connected to the data line on the right side thereof, while in the second switching region R4, the transistor TR is connected to the data line on the left side thereof, and in FIG. 8, in both the first switching region R2 and the second switching region R4, the transistor TR is connected to the data line on the right side thereof.

In the third example, as in the first example, each of the first upper wiring UW1 and the second upper wiring UW2 resembles a Z-shape and include the first upper wiring portion UWP1, the second upper wiring portion UWP2, and the third upper wiring portion UWP3; each of the first lower wiring LW1 and the second lower wiring LW2 resembles an L-shape, and includes the first lower wiring portion LWP1 and the second lower wiring portion LWP2. However, in the third example, unlike the first example, the first upper wiring portions UWP1 of the first upper wiring UW1 and the second upper wiring UW2 are both located on the same side (illustrated as the right side in FIG. 8) of the second upper wiring portions UWP2, and the second lower wiring portions LWP2 of the first lower wiring LW1 and the second lower wiring LW2 both extend in the same direction (illustrated as rightward in FIG. 8) from the first lower wiring portion LWP1. With this structure, in the first switching region R2 or the second switching region R4, the first data line DL1 or the second data line DL2, which needs to be connected to the transistor, alternately appears on the left side so as to be connected to the transistor, and the second data line DL2 or the first data line DL1, which does not need to be connected to the transistor, alternately appears on the right side.

The D-D sectional structure passing through the fourth switching point SP4 shown in FIG. 9 is the same as the A-A sectional structure shown in FIG. 4, which is inverted right and left. The upper end of the conductor DT penetrating the scan line layer SLL is in contact with the first upper wiring UW1, and the lower end is in contact with the right end portion of the first lower wiring LW1 (the end portion of the second lower wiring portion LWP2 on the opposite side from the first lower wiring portion LWP 1), thereby electrically connecting the first upper wiring UW1 and the first lower wiring LW1, so that the first data line DL1 is switched from the first lower wiring LW1 to the first upper wiring UW1.

FIG. 8 illustrates a case where transistors are connected to a data line positioned at the right side thereof, but the present disclosure is obviously not limited thereto. For example, an alternative arrangement is that the transistors are each connected to a data line on the left side thereof. In this case, the first and second data lines DL1 and DL2 may be disposed such that the first upper wiring portions UWP1 of the first and second upper wirings UW1 and UW2 are both located on the left side of the second upper wiring portions UWP2, and the second lower wiring portions LWP2 of the first and second lower wirings LW1 and LW2 both extend leftward from the first lower wiring portions LWP1. With this structure, in the first switching region R2 or the second switching region R4, the first data line DL1 or the second data line DL2, which needs to be connected to the transistor, alternately appears on the right side in order to be connected to the transistor, and the second data line DL2 or the first data line DL1, which does not need to be connected to the transistor, alternately appears on the left side.

Further, the third example may also adopt the wiring structure shown in the second example, that is, each of the first upper wiring UW1 and the second upper wiring UW2 resembles an L-shape and includes the fourth upper wiring portion UWP4 and the fifth upper wiring portion UWP5; each of the first lower wiring LW1 and the second lower wiring LW2 resembles a Z-shape, and includes the third lower wiring portion LWP3, the fourth lower wiring portion LWP4, and the fifth lower wiring portion LWP5.

The pixels of the same column are connected to the data lines on the same side while the 1G2D driving can be implemented, which cannot be achieved with the comparative example shown in FIG. 12 but is possible when the scheme of the present disclosure is employed. Therefore, the present disclosure significantly improves the degree of freedom of panel design. Also, the third example allows all the pixels to be formed in the same manner without changing the positions of the transistors with respect to the pixel electrodes row by row as in the first and second examples, so that the manufacturing process is more simplified.

Figure 10:
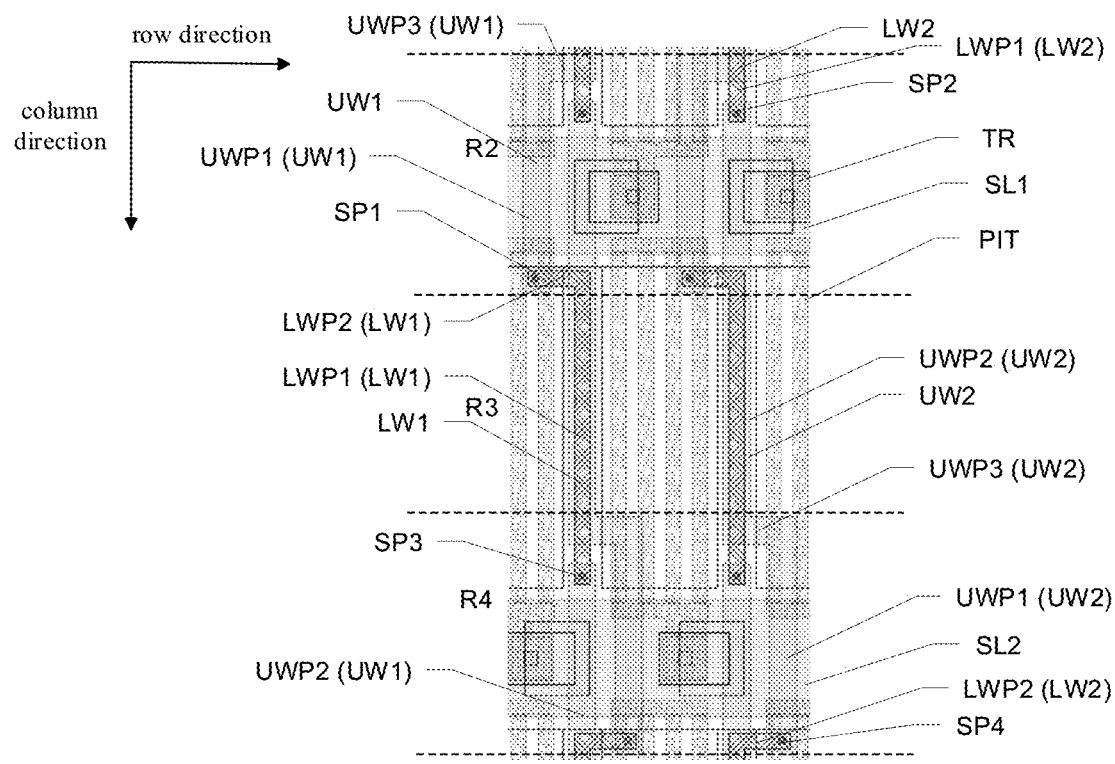
FIG. 10 is a partially enlarged view of a fourth example of the liquid crystal display panel LCP according to the present disclosure when viewed from the observer side.

FIG. 10 shows a fourth example of the liquid crystal display panel LCP according to the present disclosure. In the fourth example shown in FIG. 10, the upper wiring and the lower wiring are vertically inverted with respect to the upper wiring and the lower wiring in the first example shown in FIG. 3.

Specifically, as shown in FIG. 3, in the first example, the second lower wiring portion LWP2 of the lower wiring is connected to the end portion of the first lower wiring portion LWP1 on the downstream side in the column direction, the first upper wiring portion UWP1 and the third upper wiring portion UWP3 of the upper wiring are connected to the end portion of the second upper wiring portion UWP2 on the upstream side in the column direction, and the first upper wiring portion UWP1 of the upper wiring is located upstream in the column direction with respect to the third upper wiring portion UWP3.

In the fourth example, after the vertical inversion, as shown in FIG. 10, the second lower wiring portion LWP2 of the lower wiring is connected to the end portion of the first lower wiring portion LWP1 on the upstream side in the column direction, the first upper wiring portion UWP1 and the third upper wiring portion UWP3 of the upper wiring are connected to the end portion of the second upper wiring portion UWP2 on the downstream side in the column direction, and the first upper wiring portion UWP1 of the upper wiring is located downstream in the column direction with respect to the third upper wiring portion UWP3.

Figure 11:
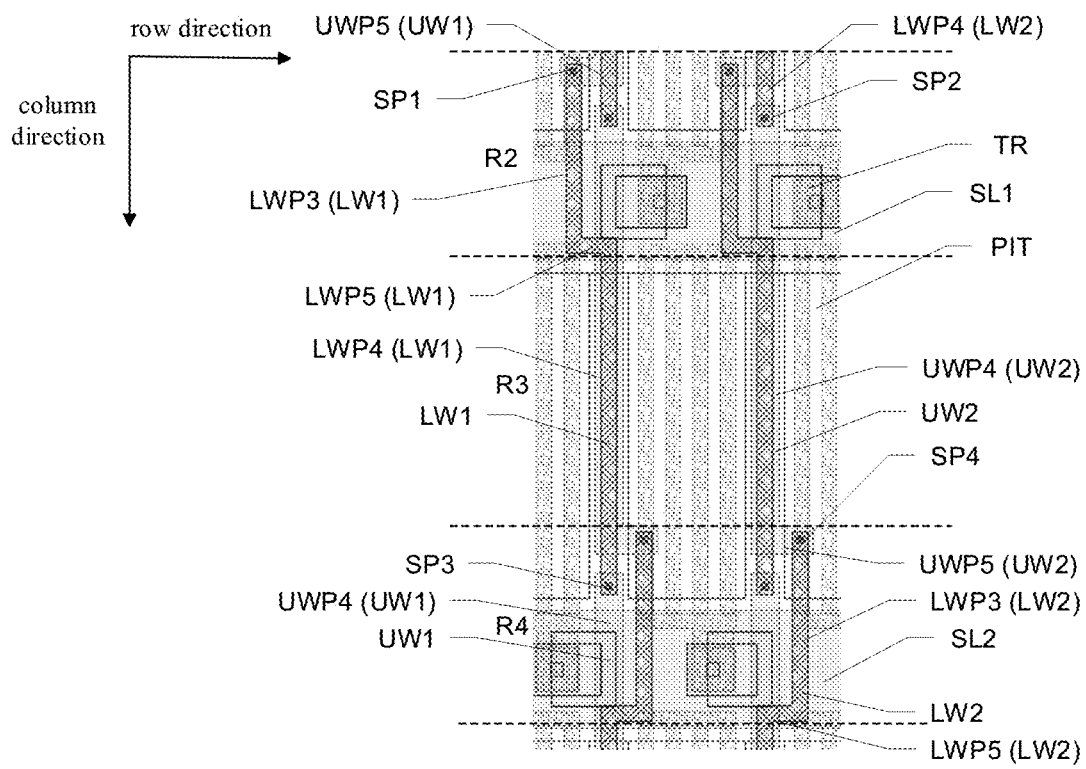
FIG. 11 is a partially enlarged view of a fifth example of the liquid crystal display panel LCP according to the present disclosure when viewed from the observer side.

FIG. 11 shows a fifth example of the liquid crystal display panel according to the present disclosure. In the fifth example shown in FIG. 11, the upper wiring and the lower wiring are vertically inverted with respect to the upper wiring and the lower wiring in the second example shown in FIG. 6.

Specifically, as shown in FIG. 6, in the second example, the fifth upper wiring portion UWP5 of the upper wiring is connected to the end portion of the fourth upper wiring portion UWP4 on the upstream side in the column direction, the third and fifth lower wiring portions LWP3 and LWP5 of the lower wiring are connected to the end portion of the fourth lower wiring portion LWP4 on the downstream side in the column direction, and the third upper wiring portion LWP3 of the lower wiring is located downstream in the column direction with respect to the fifth upper wiring portion LWP5.

In the fifth example, after the vertical inversion, as shown in FIG. 11, the fifth upper wiring portion UWP5 of the upper wiring is connected to the end portion of the fourth upper wiring portion UWP4 on the downstream side in the column direction, the third lower wiring portion LWP3 and the fifth lower wiring portion LWP5 of the lower wiring are connected to the end portion of the fourth lower wiring portion LWP4 on the upstream side in the column direction, and the third upper wiring portion LWP3 of the lower wiring is located upstream in the column direction with respect to the fifth upper wiring portion LWP5.

In the first example and the second example, the data line is switched from the upper wiring to the lower wiring at the downstream in the column direction of the connection point where the data line is electrically connected to the transistor, while in the fourth example and the fifth example, the data line is switched from the lower wiring to the upper wiring at the upstream in the column direction of the connection point where the data line is electrically connected to the transistor. As a result of the vertical inversion, in the fourth and fifth examples, in the first switching region R2, the transistor TR is located on the left side with respect to the central portion of the connected pixel electrode and is connected to the second data line DL2 located on the left side thereof in the second switching region R4, the transistor TR is located on the right side with respect to the central portion of the connected pixel electrode, and is connected to the first data line DL1 located on the right side thereof.

Further, the fourth example and the fifth example may also be combined with the third example so that pixels of the same column in FIGS. 10 and 11 are each connected to data lines located on the same side.

Further, in the above example, as shown in for example the second switching point SP2 in FIG. 6, a case where a part of the data line overlaps the pixel electrode PIT in the thickness direction in the switching point may occur. When the overlapping area is large, the display effect may be deteriorated. In order to alleviate this problem, at the switching point, a region where the data line overlaps the pixel electrode in the thickness direction may be covered with a black matrix, or a corresponding portion of the pixel electrode may be removed so that the data line does not overlap the pixel electrode in the thickness direction.

Further, in the above example, the upper wiring and the lower wiring are designed as resembling Z-shapes or L-shapes, but it is apparent that the upper wiring and the lower wiring may take any other suitable shapes. Further, in the above example, the first data line and the second data line are formed by repeating the same wiring pattern, but it is obvious that the respective data lines may also be formed by connecting different wiring patterns together.

The above examples are merely illustrative, and the present disclosure is not limited thereto. Any person skilled in the art can easily conceive of changes or substitutions within the technical scope of the present disclosure, and all such changes or substitutions are included in the scope of the present disclosure. Therefore, the protection scope of the present disclosure shall be subject to the protection scope of the appended claims.

What is claimed is:

1. A liquid crystal display panel comprising:
    a plurality of pixels arranged in a row direction and a column direction, the pixel comprising a transistor;
    a plurality of data lines extending the column direction, and including a first data line and a second data line; and
    a plurality of scan lines extending the row direction, and crossing the plurality of data lines,
    wherein at least a portion of the first data line and a portion of the second data line are disposed between two directly adjacent pixel columns, and partially overlap in a thickness direction of the liquid crystal display panel,
    the first data line comprises a first upper wiring and a first lower wiring arranged in the column direction, the first lower wiring being electrically connected to the first upper wiring,
    the second data line comprises a second upper wiring and a second lower wiring arranged in the column direction, the second lower wiring being electrically connected to the second upper wiring,
    the first upper wiring and the second lower wiring being the portion of the first data line and the portion of the second data line which partially overlap in the thickness direction, and the second upper wiring and the first lower wiring being the portion of the first data line and the portion of the second data line which partially overlap in the thickness direction,
    the liquid crystal display panel comprises a data line upper layer and a data line lower layer, the data line lower layer being located at a side of a backlight of the liquid crystal display panel with respect to the data line upper layer,
    the first upper wiring and the second upper wiring are formed in the data line upper layer,
    the first lower wiring and the second lower wiring are formed in the data line lower layer,
    the liquid crystal display panel further comprises a scan line layer in which the scan line is formed, and
    the scan line layer is located between the data line upper layer and the data line lower layer.

2. The liquid crystal display panel according to claim 1, wherein
    the liquid crystal display panel further comprises two substrates disposed opposite to each other, and
    the data line lower layer is located between the scan line layer and a substrate on the backlight side.

3. A liquid crystal display panel comprising:
    a plurality of pixels arranged in a row direction and a column direction, the pixel comprising a transistor;
    a plurality of data lines extending the column direction, and including a first data line and a second data line; and
    a plurality of scan lines extending the row direction, and crossing the plurality of data lines,
    wherein at least a portion of the first data line and a portion of the second data line are disposed between two directly adjacent pixel columns, and partially overlap in a thickness direction of the liquid crystal display panel,
    the first data line comprises a first upper wiring and a first lower wiring arranged in the column direction, the first lower wiring being electrically connected to the first upper wiring,
    the second data line comprises a second upper wiring and a second lower wiring arranged in the column direction, the second lower wiring being electrically connected to the second upper wiring,
    the first upper wiring and the second lower wiring being the portion of the first data line and the portion of the second data line which partially overlap in the thickness direction, and the second upper wiring and the first lower wiring being the portion of the first data line and the portion of the second data line which partially overlap in the thickness direction,
    a first overlapping region, a first switching region, a second overlapping region, and a second switching region are arranged along the column direction,
    in the first overlapping region, the first upper wiring and the second lower wiring overlap in the thickness direction,
    in the first switching region, the first data line is switched from the first upper wiring to the first lower wiring at a first switching point, and the second data line is switched from the second lower wiring to the second upper wiring at a second switching point,
    in the second overlapping region, the first lower wiring and the second upper wiring overlap in the thickness direction,
    in the second switching region, the first data line is switched from the first lower wiring to the first upper wiring at a third switching point, and the second data line is switched from the second upper wiring to the second lower wiring at a fourth switching point, and in one of the first switching region or the second switching region, the first upper wiring is electrically connected to one of the transistors, and in another of the first switching region or the second switching region, the second upper wiring is electrically connected to another of the transistors.

4. The liquid crystal display panel according to claim 3, wherein the scan lines include a first scan line and a second scan line adjacent to the first scan line in the column direction, the first scan line passes through the first switching region, the second scan line passes through the second switching region, and when viewing the liquid crystal display panel from an observer side, the first switching point and the second switching point are located on opposite sides of the first scan line, the third switching point and the fourth switching point are located on opposite sides of the second scan line, and the first upper wiring and the second upper wiring cross the first scan line and the second scan line.

5. The liquid crystal display panel according to claim 3, wherein the scan lines includes a first scan line and a second scan line adjacent to the first scan line in the column direction, the first scan line passes through the first switching region, the second scan line passes through the second switching region, and when viewing the liquid crystal display panel from an observer side, the first switching point and the second switching point are located on a same side of the first scan line, the third switching point and the fourth switching point are located on a same side of the second scan line, and the first upper wiring and the second lower wiring cross the first scan line, or the first lower wiring and the second upper wiring cross the second scan line.

6. The liquid crystal display panel according to claim 4, wherein each of the first upper wiring and the second upper wiring includes a first upper wiring portion, a second upper wiring portion, and a third upper wiring portion, the first upper wiring portion and the second upper wiring portion extending along the column direction, and the third upper wiring portion extending along a direction crossing the column direction and connecting the first upper wiring portion and the second upper wiring portion, each of the first lower wiring and the second lower wiring includes a first lower wiring portion and a second lower wiring portion, the first lower wiring portion extending along the column direction, and the second lower wiring portion extending along a direction crossing the column direction and being connected with the first lower wiring portion at one end, the second upper wiring portion of the first upper wiring and the first lower wiring portion of the second lower wiring being the portion of the first data line and the portion of the second data line which partially overlap, and the second upper wiring portion of the second upper wiring and the first lower wiring portion of the first lower wiring being the portion of the first data line and the portion of the second data line which partially overlap, and for each of the first data line and the second data line, an end portion of the second upper wiring portion on an opposite side from the third upper wiring portion is electrically connected to an end portion of the first lower wiring portion on an opposite side from the second lower wiring portion, and an end portion of the first upper wiring portion on an opposite side from the third upper wiring portion is electrically connected to an end portion of the second lower wiring portion on an opposite side from the first lower wiring portion.

7. The liquid crystal display panel according to claim 5, wherein each of the first upper wiring and the second upper wiring includes a fourth upper wiring portion and a fifth upper wiring portion, the fourth upper wiring portion extending along the column direction, and the fifth upper wiring portion extending along a direction crossing the column direction and being connected with the fourth upper wiring portion at one end, each of the first lower wiring and the second lower wiring includes a third lower wiring portion, a fourth lower wiring portion, and a fifth lower wiring portion, the third lower wiring portion and the fourth lower wiring portion extending along the column direction, and the fifth lower wiring portion extending along a direction crossing the column direction and connecting the third lower wiring portion and the fourth lower wiring portion, the fourth upper wiring portion of the first upper wiring and the fourth lower wiring portion of the second lower wiring being the portion of the first data line and the portion of the second data line which partially overlap, and the fourth upper wiring portion of the second upper wiring and the fourth lower wiring portion of the first lower wiring being the portion of the first data line and the portion of the second data line which partially overlap, for each of the first data line and the second data line, an end portion of the fourth upper wiring portion on an opposite side from the fifth upper wiring portion is electrically connected to an end portion of the fourth lower wiring portion on an opposite side from the fifth lower wiring portion, and an end portion of the fifth upper wiring portion on an opposite side from the fourth upper wiring portion is electrically connected to an end portion of the third lower wiring portion on an opposite side from the fifth lower wiring portion.

8. The liquid crystal display panel according to claim 1, wherein the transistors of a n-th row and a (n+1)-th row of pixels are connected to the scan lines to which a scan voltage is input at the same timing, n>0 and n being an integer, the first data line and the second data line are disposed between an i-th column and an (i+1)-th column of pixels, i>0 and i being an integer, and the transistor of a pixel located in the n-th row and the i-th column is connected to the first data line, and the transistor of a pixel located in the (n+1)-th row and the (i+1)-th column is connected to the second data line.

9. The liquid crystal display panel according to claim 1, wherein the transistors of a n-th row and a (n+1)-th row of pixels are connected to the scan lines to which a scan voltage is input at the same timing, n>0 and n being an integer, the first data line and the second data line are disposed between an i-th column and an (i+1)-th column of pixels, i>0 and i being an integer, and the transistor of a pixel located in the n-th row and the i-th column is connected to the first data line, and the transistor of a pixel located in the (n+1)-th row and the i-th column is connected to the second data line.

10. The liquid crystal display panel according to claim 8, wherein the pixel further comprises a pixel electrode, a gate electrode of the transistor is electrically connected to the scan line, a drain electrode of the transistor is electrically connected to the corresponding first data line or second data line, and a source electrode of the transistor is electrically connected to the pixel electrode, the transistor is located on a side of connected one of the first data line or the second data line with respect to a central portion of the pixel electrode, and at a position where the one of the first data line or the second data line is connected to the transistor, another of the first data line or the second data line is located at an opposite side of the one of the first data line or the second data line from the transistor.

11. A liquid crystal display panel comprising:

a plurality of pixels arranged in a row direction and a column direction, the pixel comprising a transistor;

a plurality of data lines extending the column direction, and including a first data line and a second data line; and a plurality of scan lines extending the row direction, and crossing the plurality of data lines, wherein at least a portion of the first data line and a portion of the second data line are disposed between two directly adjacent pixel columns, and partially overlap in a thickness direction of the liquid crystal display panel, the transistors of a n-th row and a (n+1)-th row of pixels are connected to the scan lines to which a scan voltage is input at the same timing, n>0 and n being an integer, the first data line and the second data line are disposed between an i-th column and an (i+1)-th column of pixels, i>0 and i being an integer, and the transistor of a pixel located in the n-th row and the i-th column is connected to the first data line, and the transistor of a pixel located in the (n+1)-th row and the (i+1)-th column is connected to the second data line, the pixel further comprises a pixel electrode, a gate electrode of the transistor is electrically connected to the scan line, a drain electrode of the transistor is electrically connected to the corresponding first data line or second data line, and a source electrode of the transistor is electrically connected to the pixel electrode, the transistor is located on a side of connected one of the first data line or the second data line with respect to a central portion of the pixel electrode, and at a position where the one of the first data line or the second data line is connected to the transistor, another of the first data line or the second data line is located at an opposite side of the one of the first data line or the second data line from the transistor, the first data line comprises a first upper wiring and a first lower wiring arranged in the column direction, the first lower wiring being electrically connected to the first upper wiring, and at a switching point where the first data line is switched from the first upper wiring to the first lower wiring, an area in which the data line and the pixel electrode overlap in the thickness direction is covered with a black matrix.

12. The liquid crystal display panel according to claim 1, further comprising:

a data line drive circuit for supplying a signal voltage corresponding to input display data to the transistors via the data lines; and a scan line drive circuit for supplying a scan voltage for selecting a row of the pixels to be driven to the transistors via the scan lines.

* * * * *